March 31, 1959 — R. F. COSTELLO — 2,879,794
CHECK VALVE
Filed Feb. 12, 1958
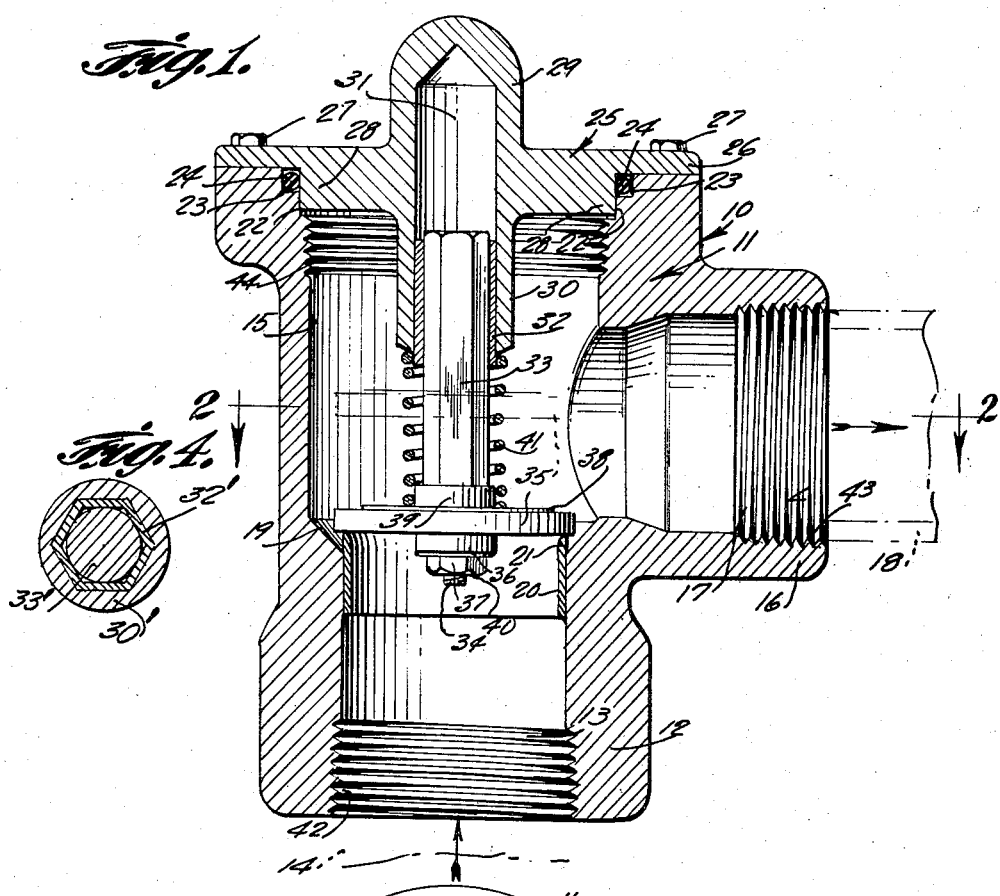
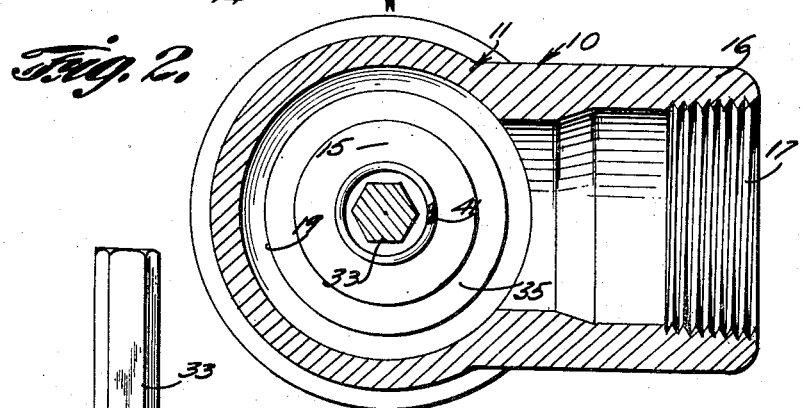
INVENTOR.
Raymond Francis Costello
ATTORNEYS United States Patent Office 2,879,794
Patented Mar. 31, 1959

2,879,794
CHECK VALVE

Raymond Francis Costello, Miami Shores, Fla.

Application February 12, 1958, Serial No. 714,844

3 Claims. (Cl. 137—542)

This invention relates to a valve mechanism, and more particularly to a check valve.

The object of the invention is to provide a check valve which will serve to effectively control the flow of fluid such as water which is being pumped from a well.

Another object of the invention is to provide a check valve which will efficiently function without interruptions, and wherein the possibility of small particles such as particles of sand lodging on the seat ring are eliminated or minimized and wherein the check valve can be readily cleaned out, the check valve being constructed so that a minimum amount of maintenance is required during the use thereof.

A still further object of the invention is to provide a check valve that includes a novel guide stem and guide bushing whereby small particles such as sand will be prevented from lodging in the guide stem and bushing, so that the check valve will be able to operate with maximum efficiency.

A further object of the invention is to provide a check valve which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a sectional view taken through the check valve of the present invention.

Figure 2 is a sectional view taken on the line 2—2 of Figure 1.

Figure 3 is an elevational view showing certain constructional details of the check valve, and with parts broken away and in section.

Figure 4 is a sectional view illustrating a modification.

Referring in detail to the drawings, the numeral 10 indicates the check valve of the present invention, and the check valve 10 includes a body member 11 which is provided with a lower portion 12 that has an inlet passageway 13 therein. The lower portion 12 is adapted to be connected to an inlet pipe 14 which may be a pipe that leads from a well, such as a well in the ground which is to be used for supplying water. The upper portion of the body member 11 is provided with an inner chamber 15, and there is further provided a side portion 16 which has an outlet passageway 17 therein, and the numeral 18 indicates by broken lines in Figure 1, an outlet pipe which is connected to the portion 16, and the outlet pipe 18 may be connected to a vacuum pump whereby water can be pumped up from the well.

There is provided in the body member 11, a tapered surface 19, and secured within the body member 11 is a ring 20 which is provided with an upper tapered edge portion 21. As shown in Figure 1, there is provided in the upper portion of the body member 11, recesses 22 and 23 which are of annular formation, and an O ring 24 is seated in the recess 23.

The check valve of the present invention further includes a cap which is indicated generally by the numeral 25, and the cap 25 includes a top section 26 which abuts the upper end of the body member 11, and the cap 25 is connected to the body member by means of securing elements 27. The cap 25 further includes a depending shoulder 28 which seats in the recess 22.

Extending upwardly from the cap 25 and secured thereto or formed integral therewith is an upstanding head portion 29, and arranged below the head portion 29 is a depending skirt portion 30, there being a space 31 defined within the head portion 29 and the skirt portion 30. A cylindrical bushing 32 is secured within the skirt portion 30, the lower end of the bushing 32 extends below the lower end of the skirt portion 30.

There is further provided a stem 33 which slidably projects through the cylindrical bushing 32, and the stem 33 is illustrated as being hexagonal shaped in cross section. The stem 33 is provided with a threaded stud 34 which is formed integral with the stem and the stud is provided on the lower end of the stem, Figure 3. The numeral 35 indicates a disk which is made of a suitable yieldable material such as rubber, and arranged below the disk 35 is a first yieldable washer 36, there being a first rigid washer 37 immediately below the washer 36. The numeral 38 indicates a second rigid washer which is arranged contiguous to the top of the disk 35, and a second yieldable washer 39 is arranged above the washer 38. The washer 28 is of slightly less diameter than the valve seat 20. A self locking nut 40 is arranged in engagement with the stud 34. The stud 34 extends through the washer 37, through the washer 36, through the disk 35, through the washer 38, and through the washer 39, and the stud 34 has a nut 40 thereon. The numeral 41 indicates a coil spring which serves to function as a return spring when the pressure drops below a predetermined level.

In Figure 4 there is illustrated a modification, wherein the numeral 30' indicates a skirt portion which functions in the same manner as the previously described skirt portion 30. A hexagonal shaped bushing 32' is arranged in the skirt portion 30, and a cylindrical guide stem 33' slidably projects into the bushing 32'. In other words, the arrangement shown in Figure 4 is the reverse from the construction or arrangement shown in Figures 1 and 2.

While hexagonal shapes have been described or illustrated in connection with the present invention, it is to be understood that the principal of the present invention is not restricted to a hexagonal shape, and any multi-point can be used to give the point contact in the guide bushing. For example, the parts such as the guide bushing or stem may be hexagonal, square, triangular, pointed, splined, or the like, and wherein 3, 4, 5 or 6 points may be used, or a star shape or serrations can be used, or any shape that will give a multi-point effect or contact with the inside of the guide bushing. Also, as shown in Figure 4, the multi-point principal or idea does not necessarily refer to the shape of the stem since it can also be accomplished by broaching a multi-point interior in the guide bushing 32' and leaving the stem 33' round. In other words a multi-point contact between the outer diameter of the stem and the inner diameter of the guide bushing is provided.

As shown in Figure 1, the portion 12 may be threaded interiorly as at 42 whereby the pipe 14 can be readily connected to the portion 12, and the portion 16 may be threaded as at 43 whereby the pipe 18 can be connected to the portion 16. Also, the top of the body member 11 may be threaded as at 44.

From the foregoing, it is apparent that there has been provided a check valve which functions as follows. A pipe such as the pipe 14 is adapted to be connected to the portion 12 of the body member 11, and the pipe 14 may be a pipe which is used for conveying water from a well. The body member 11 further includes the side portion 16 which has a pipe 18 connected thereto, and the pipe 18 leads to a vacuum pump or the like whereby water can be pumped up from the well. As long as there is sufficient vacuum pressure, the spring 41 will be compressed, and the disk 35 will be held in the raised position as indicated by broken lines in Figure 1 so that water or other fluid can flow through the passageway 13 then out through the passageway 17, as indicated by arrows in Figure 1. When vacuum falls before a predetermined level, the spring 41 will return the parts to the position shown in Figure 1 so that no further flow of fluid will pass through the check valve. With the parts in the solid line position of Figure 1, it will be seen that the disk 35 engages the upper end of the valve seat 20 so as to prevent further flow of fluid in either direction. In other words, the check valve serves to insure that there will be no reverse flow of fluid when pressure decreases or changes in the line.

Thus, it will be seen that there has been provided a T-shaped check valve especially suitable for use with wells where the check valve can be mounted vertically. The main body member 11 is adapted to be screwed directly on the top end of the well pipe 14 so as to reduce to only one joint the possibility for an air leak. The stem 33 is multi-point in shape instead of round so as to make it practically impossible for sand to wedge in between the multi-point stem and its round guide bushing 32 and thus freeze up the action to prevent the seat washer or disk 35 from returning to the brass seat ring 20 and this is a common failure of all valves with round guide stems. Furthermore, each time the valve opens, the water which is in the space 31 above the stem 30, is forced out along the openings between the points of the multi-point and guide stem 33 which serves to flush out any sands or small particles which might have accidentally entered.

The disk 35 is backed up by brass washer 38 which is smaller than the inside diameter of the brass seat ring 20 so as to permit the disk 35 to flex slightly to fit itself to the seat 20 in case one side of the seat engages slightly before the other side. In addition to this, there is a small rubber washer 39 and a washer 37 which are arranged above and below the disk 35 so that when the unit is assembled as shown in Figure 3, the parts will flex and in effect act as a slight universal joint to permit the disk 35 even greater flexibility. This insures that the disk 35 will always set flat on the ring 20 all the way around with practically equal pressure all the way around. From a practical manufacturing standpoint, this condition is impossible to obtain with poppet valves or seat washers which are mounted rigid on the guide stem.

Because of the very narrow crowned seating surface 21 of the ring 20, the possibility of sand or small particles lodging on the ring 20 is reduced to a minimum.

To pump out the well, the cap 25 is removed by removing the screws 27, and then the cap 25 can be lifted off and then a person can reach in and remove the stem 33 and associated parts and then a pipe connection can be screwed directly into the threads 44 and a plug can be screwed into the portion 16. If at any time after the original installation it is necessary to pump out the well or service the valve, it can be done in the same manner without disturbing the entire system.

The neoprene ring 24 is used so that no matter how many times the cap is removed, a new gasket is not necessary. Furthermore, by setting the cap 25 directly on the main body 11, with a metal to metal contact, the stem and disk 35 will always set square with the ring 20 and the head space designed and manufactured into the valve never changes. This is not possible when using a regular gasket, which makes the valve foolproof from a servicing standpoint.

The return spring 41 engages the lower end of the bushing 32 and also fits over the washer 39 and since the washer 39 is of greater diameter or cross sectional area than the stem 33, it will be seen that the spring 41 will be held away from the stem 33 so as to prevent any possibility of drag at this point.

An important feature of the present invention is the multipointed guide stem which may be incorporated or formed in the stem itself as shown in Figure 1, or else the parts may be reversed as shown in Figure 4 so that the guide 32' is multi-pointed and the stem 33' is round. Furthermore, this feature may be used in a straight line check valve. The stud 34 may be turned directly on the stem 33 and the self locking nut 40 can be used for adjusting tension on the stacks of various washers. The upper edge of the ring which defines the valve seat is tapered to almost a sharp edge.

The above description of the invention is for illustrative purposes only and it is understood that modifications may be made in the construction within the scope and the spirit of the following claims.

I claim:

1. In a check valve, a body member provided with a lower portion having an inlet passageway therein, a side portion extending outwardly from said body member and provided with an outlet passageway, there being a chamber in the upper portion of said body member communicating with said passageways there being a tapered surface in the interior of said body member adjacent the lower portion of said chamber, a ring secured within said body member adjacent said tapered surface and said ring defining a valve seat, there being first and second annular recesses in the upper inner portions of said body member, a cap including a top section abutting the upper end of said body member, securing elements extending through said top section and engaging said body member, said cap further includes a depending shoulder engaging said first recess, a ring member seated in said second recess, said cap further including an upstanding head portion and a depending skirt portion, there being aligned spaces in said head and skirt portions, a cylindrical bushing secured within said skirt portion, a multi-point shaped stem slidably engaging said bushing, there being a stud on the lower end of said stem, a yieldable disk arranged below said stem and said disk being mounted for movement into and out of engagement with the valve seat, a first yieldable washer immediately below said disk, a first rigid washer below said yieldable washer, a second rigid washer above said yieldable disk, a second yieldable washer above said second rigid washer, the stud of the stem extending through said first rigid washer, through said first yieldable washer, through said disk, through said second rigid washer, and through said second yieldable washer, a self locking nut on the lower end of the stud, and a coil spring having one end abutting the lower end of the skirt portion and its other end surrounding the second yieldable washer.

2. The structure as defined in claim 1 wherein the upper edge of the ring which defines the valve seat is tapered to almost a sharp edge.

3. In a check valve, a body member provided with a lower portion having an inlet passageway therein, a side portion extending outwardly from said body member and provided with an outlet passageway, there being a chamber in the upper portion of said body member communicating with said passageways, there being a tapered surface in the interior of said body member adjacent the lower portion of said chamber, a ring secured within said body member adjacent said tapered surface and said ring defining a valve seat, there being first and second annular recesses in the upper inner portion of said member, a cap including a top section abutting the upper end of said body member, securing elements extending through said top section and engaging said body member, said cap further including a depending shoulder engaging said first recess, a ring member seated in said second recess, said cap further including an upstanding head portion and a depending skirt portion, there being aligned spaces in said head and skirt portions, a cylindrical bushing secured within said skirt portion, a multi-point shaped stem slidably engaging said bushing, there being a stud on the lower end of said stem, a yieldable disk arranged below said stem and said disk being mounted for movement into and out of engagement with the valve seat, a first yieldable washer immediately below said disk, a first rigid washer below said yieldable washer, a second rigid washer above said yieldable disk, a second yieldable washer above said second rigid washer, the stud of the stem extending through said first rigid washer, through said first yieldable washer, through said disk, through said second rigid washer, and through said second yieldable washer, a self locking nut on the lower end of the stud, and a coil spring having one end abutting the lower end of the skirt portion and its other end surrounding the second yieldable washer, the upper edge of the ring which defines the valve seat being tapered to almost a sharp edge, said second rigid washer being of slightly less diameter than the ring which defines the valve seat.

References Cited in the file of this patent

UNITED STATES PATENTS

| | | |
|---|---|---|
| 142,458 | Gould | Sept. 2, 1873 |
| 1,530,924 | Biedermann | Mar. 24, 1925 |
| 1,971,713 | Greve | Aug. 28, 1934 |
| 2,143,399 | Abercrombie | Jan. 10, 1939 |
| 2,712,427 | Welborn | July 5, 1955 |